Figure 1:
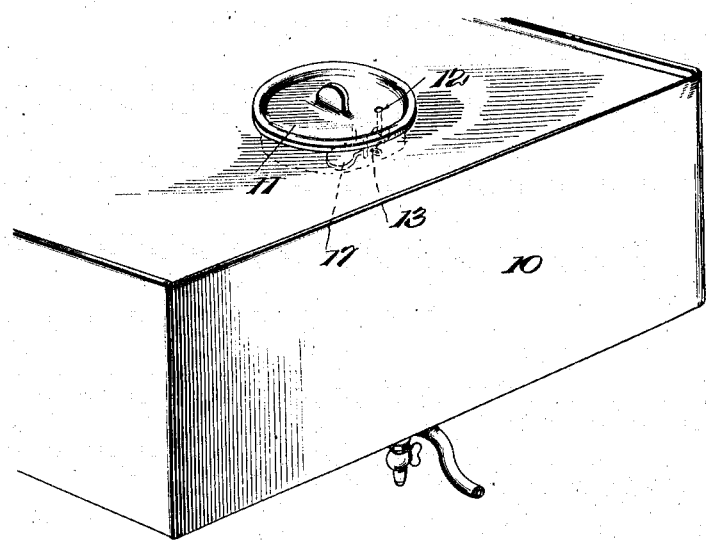

A. L. HARTLEY.
VALVE FOR FUEL TANK CLOSURE PLUGS.
APPLICATION FILED SEPT. 19, 1919.

1,372,506.

Patented Mar. 22, 1921.

Inventor.
A. L. Hartley
by Lacey & Lacey,
his Atty's.

UNITED STATES PATENT OFFICE.

ABRAHAM L. HARTLEY, OF SILVER CITY, UTAH.

VALVE FOR FUEL-TANK CLOSURE-PLUGS.

1,372,506.

Specification of Letters Patent.   Patented Mar. 22, 1921.

Application filed September 19, 1919. Serial No. 324,973.

*To all whom it may concern:*

Be it known that I, ABRAHAM L. HARTLEY, a citizen of the United States, residing at Silver City, in the county of Juab and State of Utah, have invented certain new and useful Improvements in Valves for Fuel-Tank Closure-Plugs, of which the following is a specification.

This invention relates to an improved valve for the closure plugs of motor vehicle fuel tanks and has as one of its principal objects to provide a valve which will, when the vehicle is not in use, prevent evaporation through the air vent opening of the plug.

The invention has as a further object to provide a valve so constructed and mounted that jolting of the vehicle when passing over roadways will serve to unseat the valve sufficiently to permit a proper venting of the tank.

A still further object of the invention is to provide a valve which will readily open under the influence of suction within the tank.

And the invention has as a still further object to provide a valve which may be readily applied to substantially any conventional type of fuel tank closure plug.

Other and incidental objects will appear hereinafter.

Figure 2:
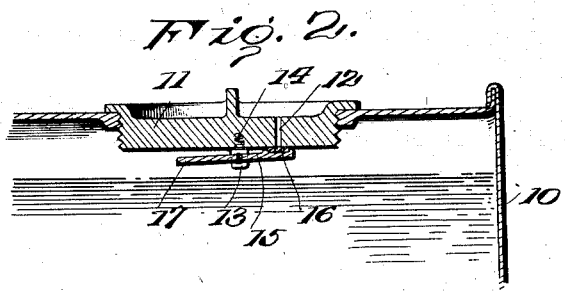
Figure 3:
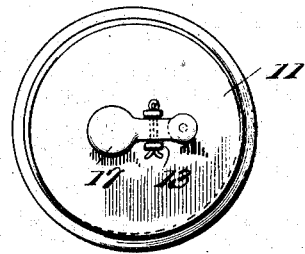
Figure 4:
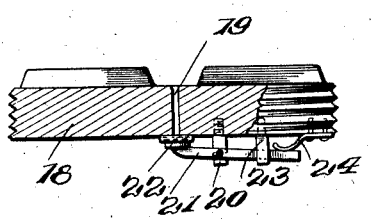
Figure 5:
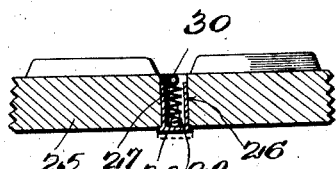
Figure 6:
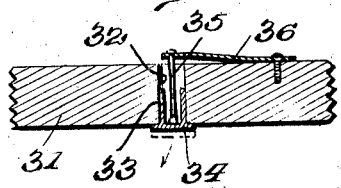

In the drawings:

Figure 1 is a fragmentary perspective view showing the plug of a conventional type of fuel tank equipped with my improved valve, Fig. 2 is a fragmentary sectional view taken through the plug and particularly illustrating the mounting of the valve, Fig. 3 is a bottom plan view of the plug with the valve thereon, Fig. 4 is a fragmentary sectional view showing a slight modification of the invention, Fig. 5 is a similar view showing a further modification, and Fig. 6 is a view similar to Figs. 4 and 5 and showing a still further modification of the invention.

In order that the construction, mounting and operation of my improved valve may be accurately understood, I have shown the device in connection with the closure plug of a conventional type of motor vehicle fuel tank 10. The plug is indicated at 11 and, as is usual, this plug is threaded into the filling opening of the tank for normally closing said opening. Formed through the plug is the ordinary minute vent opening 12 for the tank, the closure plugs of fuel tanks being invariably provided with such openings.

In carrying the invention into effect, I employ a valve supporting yoke 13 which is formed with a stem 14 threaded into or otherwise secured to the plug at its lower side and adjacent the opening 12. Mounted to swing upon this yoke is a valve lever 15 the pivot of which is formed preferably by a cotter pin extending, as particularly shown in Fig. 3, through the arms of the yoke and through the lever. This construction provides an arrangement whereby the valve lever may be readily mounted upon the yoke. Further, in this connection, it is to be observed that since the supporting yoke may be readily engaged with the plug, the valve as a whole may be easily mounted in position. At one end, the valve lever is formed at its inner side with a raised flattened portion providing a valve 16 or this valve may be in the nature of a disk of suitable material set into a cup formed on the inner side of the valve lever at its adjacent end. Normally holding the valve to overlie the inner end of the opening 12 is a weight 17 formed on or otherwise secured to the opposite end of the valve lever. Thus, it will be seen, when the vehicle is not in use, the valve 16 will be held to close the opening 12 for preventing evaporation of the fuel within the fuel tank. However, while the vehicle is in use, the jolting of the vehicle while passing over rough roadways will serve to unseat the valve sufficiently to permit a proper venting of the tank so that the presence of the valve will not cause any harmful results. Moreover, as will be seen, suction within the tank will serve to unseat the valve so that the fuel within the tank may readily flow therefrom. I, therefore, provide a highly effective type of valve for the purpose set forth and, as will be appreciated, the valve is of such nature that it may be readily applied to substantially any conventional type of motor vehicle fuel tank closure plug.

In Fig. 4 I have illustrated a slight modification of the invention. In this figure a closure plug is indicated at 18 while the vent opening of the plug is indicated at 19. Fixed to the plug at its lower side is a yoke 20 corresponding to the yoke 13 of the preferred construction and pivoted upon this yoke is a valve lever 21 mounted in a manner similar to the lever 13. At one end, the lever is formed with a valve 22 corresponding to the valve 16 of the preferred construction and embracing the opposite end portion of the valve lever are the arms of a guide yoke 23 having a stem threaded into or otherwise secured to the plug. Suitably secured at one end to the lower side of the plug near the adjacent end of the valve lever is a flat spring 24, the free end portion of which is arranged to bear against the inner side of the lever at its adjacent end portion. Thus, this spring will act to normally hold the valve 22 to close the vent opening 19 and will supplant the weight as employed in the preferred construction.

In Fig. 5 I have shown a further modification of the invention. In this figure, a closure plug is indicated at 25. Formed through the plug is an enlarged vent opening 26 and slidably received within this opening are the spaced guide fingers 27 of a valve 28 lying at the inner side of the plug. Suitably secured at one end to said valve is a contractile spring 29, the opposite end of which is fixed to a pin 30 extending across the vent opening. Thus, the spring will normally hold the valve closed overlying the vent opening at its inner end.

In Fig. 6 of the drawings, I have illustrated a still further modification of the device. In this modification a closure plug is indicated at 31. Formed through the plug is an enlarged vent opening 32 and slidably received within this opening, as in the modification shown in Fig. 5, are the spaced guide fingers 33 of a valve 34 lying at the inner side of the plug. Extending upwardly from the valve through the vent opening is a stem 35 and connected at one end to the upper end of this stem is a flat spring 36, the opposite end of which is secured to the upper side of the plug. Toward its free end the spring gradually rises from the plug so as to permit opening movement of the valve. However, as will be seen, the spring will normally hold the valve closed overlying the vent passage at its inner end.

Having thus described the invention, what is claimed as new is:

The combination with a motor vehicle fuel tank closure plug having an air vent opening therethrough, of a yoke having a stem threaded into the plug, a lever pivoted upon said yoke and provided at one end with a weight and at its opposite end with a raised flattened portion forming a valve normally held by the weight to overlie said opening.

In testimony whereof I affix my signature.

ABRAHAM L. HARTLEY. [L. s.]